United States Patent
Barrenscheen

Patent Number: 6,101,571
Date of Patent: Aug. 8, 2000

[54] CIRCUIT CONFIGURATION FOR GENERATING AN INTERRUPT SIGNAL FOR A MICROPROCESSOR

[75] Inventor: Jens Barrenscheen, München, Germany

[73] Assignee: Siemens Aktiengesellschaft, Munich, Germany

[21] Appl. No.: 09/149,685

[22] Filed: Sep. 9, 1998

[30] Foreign Application Priority Data

Sep. 9, 1997 [DE] Germany .............. 197 39 530

[51] Int. Cl.[7] ................... G06F 9/48; G06F 9/54
[52] U.S. Cl. ............. 710/266; 710/48; 710/260; 709/300
[58] Field of Search .............. 710/269, 266, 710/260, 48, 268, 262, 51, 131; 361/683, 684; 379/93.05; 375/220; 714/15, 23; 709/101, 107, 300; 711/166; 712/244; 370/465; 340/584; 701/102, 114; 713/1

[56] References Cited

U.S. PATENT DOCUMENTS 3,771,146 11/1973 Cotton et al. .
4,410,938 10/1983 Higashiyama .
5,784,625 7/1998 Walker .
5,802,153 9/1998 Sridhar et al. .
5,828,891 10/1998 Benayoun et al. .

FOREIGN PATENT DOCUMENTS 26 54 247 9/1977 Germany .
94 03 121 2/1995 Germany .

Primary Examiner—Gopal C. Ray
Attorney, Agent, or Firm—Herbert L. Lerner; Laurence A. Greenberg; Werner H. Stemer

[57] ABSTRACT

A circuit configuration for generating an interrupt signal for a microprocessor includes a multiplicity of signal generating circuits that are connected to one another via a logic combination element. Each of the signal generating circuits is configured to activate an intermediate signal when a specific event occurs for an assigned input signal. On the input side, each signal generating circuit has a respective edge detector for detecting rising and falling edges, which are routed via demultiplexers and two further logic combination elements to the set and reset inputs of a flip-flop. The structure can be programmed flexibly and detects, by hardware, an interrupt state with no additional computation loading on the microprocessor.

8 Claims, 1 Drawing Sheet

CIRCUIT CONFIGURATION FOR GENERATING AN INTERRUPT SIGNAL FOR A MICROPROCESSOR

BACKGROUND OF THE INVENTION

Field of the Invention

The invention relates to a circuit configuration for generating an interrupt signal for a microprocessor.

As is known, microprocessors and microcontrollers have input terminals for signals characterizing the operating state of the circuit environment, with the result that an interrupt signal that indicates an interrupt state can be generated internally. The microprocessor thereupon interrupts the currently running program and processes a subroutine that reacts to the state triggering the activation of the interrupt signal. Such a circuit is described in German Utility Model G 94 03 121.5 U1.

When controlling complex switching functions, for example in cyclically operated light modules, converters, or in the clocked regulation of electric motors, it is necessary to monitor a multiplicity of individual state signals and operating states formed from a combination of state signals in order to act on the current operation of the configuration by a suitable control by the microcontroller. Conventional microprocessors having individual state input signals that are processed independently of one another are overtaxed in this situation.

Although it is possible to monitor a plurality of state input signals by software-controlled, cyclic interrogation, so-called poling, this requires a considerable computation complexity given a relatively high number of state input signals to be monitored, and it does not ensure reliable identification of operating states which are present only momentarily and are supposed to trigger an interrupt.

In the German Utility Model G 94 03 121.5 U1, a plurality of interrupt signals are connected via a programmable distributor to the interrupt signal input of the microprocessor.

The generation of an interrupt signal by a comparator configuration that ascertains the change in state of the signals on a data bus is described in German Patent DE 26 54 247 B1.

SUMMARY OF THE INVENTION

It is accordingly an object of the invention to provide a circuit configuration for generating an interrupt signal for a microprocessor which overcomes the hereinafore-mentioned disadvantages of the heretofore-known devices of this general type.

With the foregoing and other objects in view there is provided, in accordance with the invention, a circuit configuration for generating an interrupt for a microprocessor to activate processing of a subroutine in the microprocessor, including: at least two input signal terminals for receiving a respective input logic signal; signal generating circuits for generating intermediate signals, each of the signal generating circuits having: a first edge detector with an input side connected to a respective one of the at least two input signal terminals for detecting a rising edge of the respective input logic signal; a second edge detector with an input side connected to the respective one of the at least two input signal terminals for detecting a falling edge of the respective input logic signal; a first demultiplexer having an input terminal, a first output terminal and a second output terminal, the input terminal connected to and disposed downstream of the first edge detector; a second demultiplexer having an input terminal, a first output terminal and a second output terminal, the input terminal connected to and disposed downstream of the second edge detector; a first logic combination element connected to the first output terminal of the first demultiplexer and the first output terminal of the second demultipler; a second logic combination element connected to the second output terminal of the first demultiplexer and the second output terminal of the second demultipler; and a storage element having a set input connected to the first logic combination element and a reset input connected to the second logic combination element, the storage element generating one of the intermediate signals; and a third logic combination element receiving the one of the intermediate signals from the storage element and outputting an interrupt signal.

The interrupt circuit configuration according to the invention enables a number of interrupt signals to be monitored flexibly and in a manner adapted to the system requirements.

Depending on the configuration of the third logic combination element, it is possible to realize different monitoring modes. If the logic combination element is configured as an OR gate, the internal interrupt signal of the microprocessor is activated when the respectively interrogated condition is present at the at least one of the state input signals. If the logic combination element is an AND gate, the internal interrupt signal of the microprocessor is activated when a predetermined combination of state signal states is present. The interrupt is triggered only when a specific pulse pattern of the state signals that are input is present. The input state that is present for monitoring is set by a corresponding setting of the demultiplexers which are connected downstream of the edge detectors. If a state that is subsequently present for monitoring is configured as a function of a currently ascertained state, the microprocessor operates as an interrupt-controlled state machine. The hardware realization of the monitoring of the state signal inputs of the microprocessor enables reliable, delay-free identification of an interrupt signal formed from a multiplicity of state signals, without an additional loading on the computation capacity of the processor. The state signal inputs are expediently combined as a port. They can therefore be addressed jointly by the CPU of the microcontroller.

In accordance with an added feature of the invention, there is a fourth logic combination element receiving one of the intermediate signals from the storage element; the third logic combination element and fourth logic combination element each has an output terminal; and a multiplexer connected to the output terminal of the third logic combination element and the output terminal of the fourth logic combination element, and the multiplexer has an output terminal outputting the interrupt signal.

In accordance with an additional feature of the invention, there is a delay element having an input terminal and an output terminal; and a fifth logic combination element having a first input terminal connected to the output terminal of the multiplexer, a second input terminal connected to the output terminal of the delay element and an output terminal for outputting the interrupt signal.

In accordance with another feature of the invention, one of the signal generating circuits has a switch connected between the first logic combination element and the storage element or between the second logic combination element and the storage element.

In accordance with a further added feature of the invention, there is a memory having bit output terminals for storing memory words with bits and for reading out the memory words, each of the first demultiplexer and the second demultiplexer is connected to one of the bit output terminals, respectively, the memory word bits read out of the memory, respectively, controlling a switching state of the first demultiplexer and the second demultiplexer.

In accordance with a concomitant feature of the invention, one of the signal generating circuits has a switch connected between the first or second logic combination element and the storage element, another of the bit output terminals of the memory is connected to the switch and one of the bits of the memory word read out of the memory is applied to the switch via the other of the bit output terminals for controlling a switching state of the switch.

Other features which are considered as characteristic for the invention are set forth in the appended claims.

Although the invention is illustrated and described herein as embodied in a circuit configuration for generating an interrupt signal for a microprocessor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block circuit diagram of a circuit configuration for generating an internal interrupt signal of a microprocessor for a plurality of external state input signals.

DESCRIPTION OF THE PREFERRED EMBODIMENTS

Figure 1:
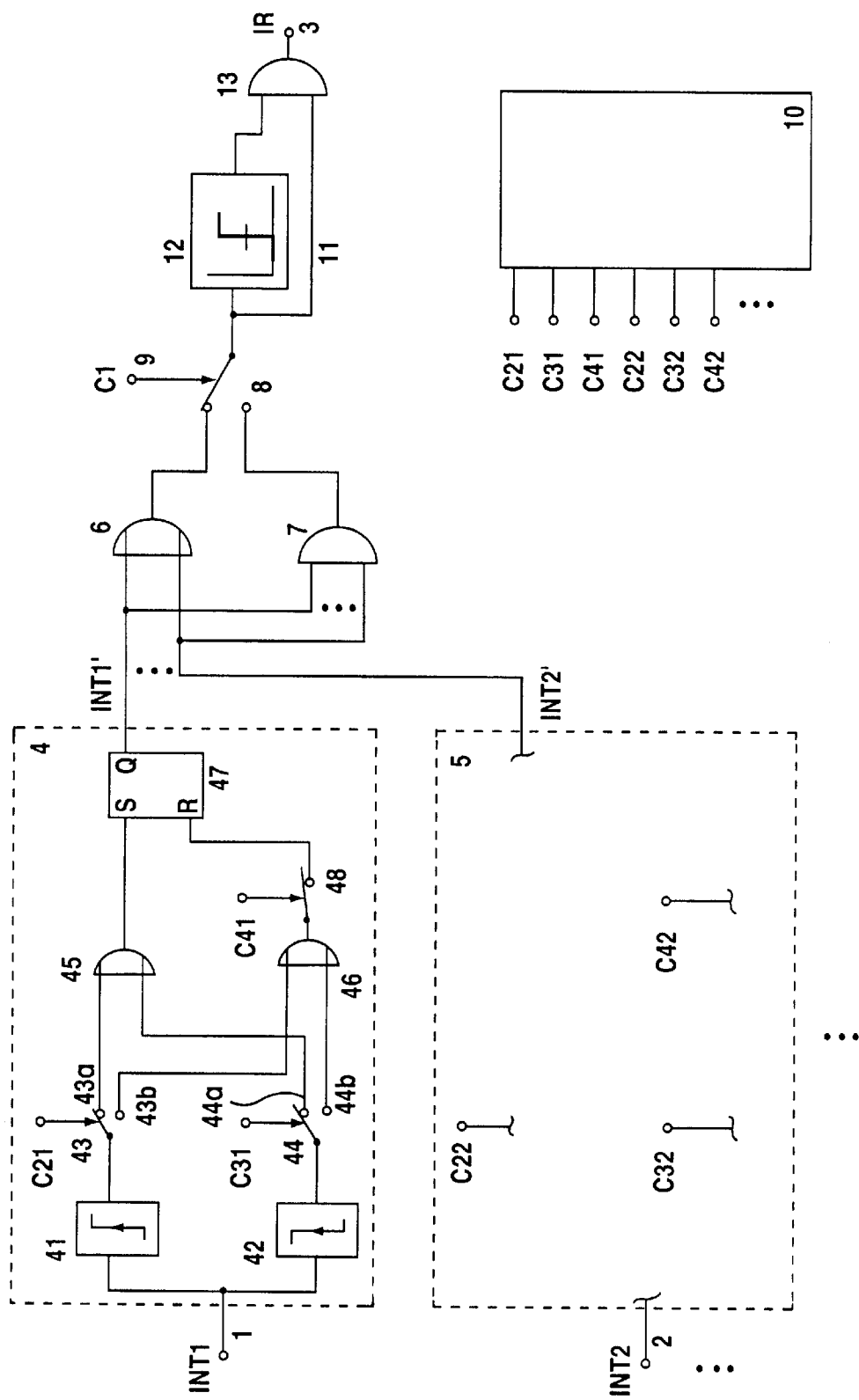

Referring now to the single FIGURE of the drawing in detail, there is shown input terminals 1, 2 for receiving signals INT1 and INT2, respectively. The input terminals 1, 2 are illustrated by way of example for a multiplicity of input terminals to each of which an external logic signal can be applied. Each of the signals INT1, INT2, . . . represents a state property of the entire circuit which is monitored and controlled by a microcontroller. The circuit that is shown generates an interrupt signal IR by a hardware logic combination at output terminal 3. The interrupt signal IR communicates to the microprocessor or microcontroller on which the circuit shown is disposed that an interrupt state is present in the system. The signals INT1, INT2 are each fed to a device 4 and 5, respectively, which generates an intermediate signal INT1' and INT2', respectively. The intermediate signals are fed to a third logic combination element 6, an OR gate in the illustrated exemplary embodiment. The on-chip interrupt signal IR is therefore activated when at least one of the intermediate signals INT1' or INT2' is activated. In a development of the invention, the intermediate signals are additionally fed to a fourth logic combination element 7, in this case an AND gate. A changeover switch or multiplexer 8 changes over between the outputs of the logic combination elements 6, 7. The intermediate signals each specify whether a respective state to be monitored is present at the assigned input signal terminal. The OR gate 6 ascertains whether the state to be monitored is present at at least one of the input signal terminals 1, 2. A changeover switch 8 alternatively changes over to the AND gate 7, with the result that it can be ascertained whether the signals INT1, INT2, . . . at the input terminals 1, 2, . . . assume a predetermined combination of states. The changeover switch 8 can be set correspondingly at its terminal 9 by the control signal C1.

The devices 4, 5 generating the intermediate signals are constructed identically. The device 4 is illustrated in detail by way of example. The input signal terminal 1 is routed to an edge detector 41 for a rising edge and an edge detector 42 for a falling edge. A demultiplexer 43, 44 is in each case connected to the edge detectors 41 and 42, respectively, on the output side. The first outputs of the demultiplexers are logically combined with one another by a first logic combination element, in this case an OR gate 45, and the respective second outputs of the demultiplexers are logically combined with one another by a second logic combination element, in this case an OR gate 46. The OR gate 45 controls a set input of a storage element 47 and an output of the OR gate 46 controls the reset input of said element. The device 4 operates in the manner described below. If the input signal INT1 has an edge, one of the edge detectors 41 or 42 responds. The flip-flop 47 is set via the OR gate 45 and the intermediate signal INT1' is thereby activated. In this manner, any change in the level of the input signal INT1 activates the intermediate signal INT1'. The setting of the demultiplexer 43, 44 can be controlled by a respective control signal C21 and C31. If, in another setting (not illustrated) of the device 4, the switch 43 is connected to its upper output terminal 43*a* and the switch 44 is connected to its lower output terminal 44*b*, the intermediate signal INT1' is activated when the input signal INT1 has a positive edge. In the event of a negative edge, the flip-flop 47 is reset again and the intermediate signal INT1' is thereby deactivated again. In this example, the intermediate signal INT1' is active for as long as an H level for the signal INT1 is present at the terminal 1. The intermediate signal INT1' is therefore generated such that it is sensitive to an H level at the input terminal 1. If the switch 43 is connected to its lower output terminal 43*b* and the switch 44 is connected to its upper output terminal 44*a*, the intermediate signal INT1' is activated for as long as an L level is present at the terminal 1. The signal INT1' is generated such that it is sensitive to an L level.

A switch 48 is expediently disposed between the output of the OR gate 46 and the reset input of the flip-flop 47. The switch 48 is switched on for the above-described high or low level-sensitive monitoring function of the device 4. A control signal C41 is used to control the switch 48. If the switch 48 is open with switches 43, 44 in position 43*a*, 44*b*, the intermediate signal INT1' is activated when the input signal at the terminal 1 has a positive-going edge. A negative-going edge remains insignificant. The resetting of the flip-flop 47 and thus the deactivation of the intermediate signal INT1' can be effected by software control by the processor. The intermediate signal INT1' is then generated in an edge-triggered manner on the basis of a positive edge. In the case of a low level-sensitive configuration (that is to say switches 43, 44 in position 43*b*, 44*a*) and if the switch 48 is open, the intermediate signal INT1' is generated in an edge-triggered manner with regard to a negative edge. The deactivation of the intermediate signal INT1' is once again effected under software control. If both switches 43, 44 are connected to their lower output terminal 43*b* and 44*b*, respectively, and the switch 48 is open, the intermediate signal INT1' is not altered by any change in the signal at the input terminal 1. The monitoring of the input terminal 1 is then switched off.

By a corresponding setting of the switches 43, 44, 48 via the respective control signals C21, C31, C41, the device 4 can be configured to the effect that the input terminal 1 is monitored on the basis of all possible signal states or signal changes of the input signal INT1 applied to it. By the respective setting of the corresponding switches in the device 5 and the remaining devices (not illustrated), the respectively assigned state signals INT1, INT2, . . . can be monitored on the basis of all possible signal states and signal transitions.

If the switch 8 is connected to the OR gate 6, the internal interrupt signal IR of the microprocessor is generated when the state sought has appeared at at least one of the inputs 1, 2, . . . . If the switch 8 is connected to the AND gate 7, the microprocessor-internal interrupt signal IR is generated when the signal state set for monitoring is present simultaneously at all the input-side terminals 1, 2, . . . . In the case of the latter setting of the switch 8, monitoring after the occurrence of a specific overall state of the system is possible, for example that a corresponding edge has appeared at all the inputs, given an edge-sensitive setting (that is to say switch 48 open), since the flip-flops in the respective devices were reset (by software).

The control signals C21, C31, C41, C22, C32, C42, . . . are expediently provided by a memory 10. Each of the signals is output by a bit of the memory. The microcontroller can therefore be operated as an interrupt-controlled state machine in that after the state that is currently set via the control signals and is to be monitored has been ascertained, a state that is predetermined by the memory 10 and is subsequently to be monitored is configured, on the basis of whose appearance the state signals present at the input terminals 1, 2, . . . are subsequently monitored.

A configuration for suppressing interfering pulses is expediently disposed downstream of the changeover switch 8. For this purpose, on the output side, the changeover switch 8 is connected to an AND gate 13 via a direct connection 11, on the one hand, and via a delay element 12 having an adjustable delay, on the other hand, the microprocessor-internal interrupt signal IR being present at the output 3 of the AND gate 13. The delay element 12 is, for example, a cascade of flip-flops or a counter operated at a high clock frequency in comparison with the switching edges of the input signals INT1, INT2, . . . . Interfering pulses are thereby filtered out by hardware.

An application of the circuit in which the OR gate 6 is connected through to the output 3 via the switch 8 is the monitoring of the switch temperature of power semiconductor switches in converters or light modules operated in a clocked manner. Specially constructed power semiconductor switches generate a signal indicating over-temperature condition. The signals are applied to the input terminals 1, 2, . . . . If one of the switches indicates an over-temperature condition, it leads to the activation of the interrupt signal IR, with the result that the microcontroller can immediately react and take countermeasures.

An application in which the AND gate 7 is connected to the output terminal 3 via the switch 8 is the regulation of synchronous electric motors in which a field has to be impressed depending on the instantaneous angle of rotation of the electric motor. The instantaneous position of the motor is ascertained via a multiplicity of control lines which are connected to the input terminals 1, 2, . . . . The reaching of the interrogated angle of rotation is communicated to the microcontroller via the interrupt signal IR, with the result that the microcontroller thereupon sets the switching transistors of the converter in such a way that field excitation is effected for the electric motor in a manner conforming to the angle of rotation. Depending on the instantaneously ascertained position of the electric motor, the switches in the devices, 4, 5, . . . are set with the pattern for the motor position that is subsequently to be expected As a result of the purely hardware-based generation of the interrupt signal, the microcontroller is not burdened with additional computation complexity. Since interference signals can occur in systems that are clocked in such a way, the delay circuit 11, 12, 13 serves for the effective hardware suppression of momentary interference.

On the basis of suitable programming of the switches disposed in the devices 4, 5, . . . , the signals at the respectively assigned input terminals 1, 2, . . . are monitored on the basis of any desired combination of state signal patterns, resulting in the execution of predetermined reactions by the microprocessor after the combination has been ascertained. The interrupt structure is flexible and simple to program and requires no additional computation complexity.

I claim:

1. A circuit configuration for generating an interrupt for a microprocessor to activate processing of a subroutine in the microprocessor, comprising:

at least two input signal terminals for receiving a respective input logic signal;

signal generating circuits for generating intermediate signals, each of said signal generating circuits including:

a first edge detector with an input side connected to a respective one of said at least two input signal terminals for detecting a rising edge of the respective input logic signal;

a second edge detector with an input side connected to said respective one of said at least two input signal terminals for detecting a falling edge of the respective input logic signal;

a first demultiplexer having an input terminal, a first output terminal and a second output terminal, said input terminal connected to and disposed downstream of said first edge detector;

a second demultiplexer having an input terminal, a first output terminal and a second output terminal, said input terminal connected to and disposed downstream of said second edge detector;

a first logic combination element connected to said first output terminal of said first demultiplexer and said first output terminal of said second demultiplexer;

a second logic combination element connected to said second output terminal of said first demultiplexer and said second output terminal of said second demultiplexer; and a storage element having a set input connected to said first logic combination element and a reset input connected to said second logic combination element, said storage element generating one of said intermediate signals; and a third logic combination element receiving said one of said intermediate signals from said storage element and outputting an interrupt signal.

2. The circuit configuration according to claim 1, including:

a fourth logic combination element receiving said one of said intermediate signals from said storage element;

said third logic combination element and said fourth logic combination element each having an output terminal; and a multiplexer connected to said output terminal of said third logic combination element and said output terminal of said fourth logic combination element, said multiplexer having an output terminal outputting said interrupt signal.

3. The circuit configuration according to claim 2, including:

a delay element having an input terminal and an output terminal; and a fifth logic combination element having a first input terminal connected to said output terminal of said multiplexer, a second input terminal connected to said output terminal of said delay element and an output terminal for outputting said interrupt signal.

4. The circuit configuration according to claim 1, wherein one of said signal generating circuits has a switch connected between said first logic combination element and said storage element.

5. The circuit configuration according to claim 1, wherein one of said signal generating circuits has a switch connected between said second logic combination element and said storage element.

6. The circuit according to claim 1, including a memory having bit output terminals for storing memory words with bits and for reading out the memory words, each of said first demultiplexer and said second demultiplexer connected to one of said bit output terminals, respectively, and the memory word bits read out of said memory, respectively, controlling a switching state of said first demultiplexer and said second demultiplexer.

7. The circuit configuration according to claim 6, wherein one of said signal generating circuits has a switch connected between said first logic combination element and said storage element, another of said bit output terminals of said memory is connected to said switch and one of the bits of the memory word read out of said memory is applied to said switch via said other of said bit output terminals for controlling a switching state of said switch.

8. The circuit configuration according to claim 6, wherein one of said devices has a switch connected between said second logic combination element and said storage element, another of said bit output terminals of said memory is connected to said switch, and one of the bits of the memory word read out of said memory is applied to said switch via said another of said bit output terminals for of controlling a switching state of said switch.

* * * * *